(12) United States Patent
Du Prez et al.

(10) Patent No.: US 8,889,799 B2
(45) Date of Patent: Nov. 18, 2014

(54) FUNCTIONALISED POLYURETHANES

(75) Inventors: Filip Du Prez, Ghent (BE); David Fournier, Ecommoy (FR); Peter Spanhove, Wetteren (BE)

(73) Assignee: Recticel N.V., Brussels (BE)

( * ) Notice: Subject to any disclaimer, the term of this patent is extended or adjusted under 35 U.S.C. 154(b) by 203 days.

(21) Appl. No.: 12/666,764

(22) PCT Filed: Jun. 26, 2008

(86) PCT No.: PCT/EP2008/058188
§ 371 (c)(1),
(2), (4) Date: Apr. 16, 2010

(87) PCT Pub. No.: WO2009/000892
PCT Pub. Date: Dec. 31, 2008

(65) Prior Publication Data
US 2010/0234482 A1 Sep. 16, 2010

(30) Foreign Application Priority Data
Jun. 27, 2007 (EP) ..................................... 07111196

(51) Int. Cl.
| | | |
|---|---|---|
| *C08G 18/00* | (2006.01) | |
| *C08F 283/04* | (2006.01) | |
| *C08G 18/73* | (2006.01) | |
| *C08G 18/32* | (2006.01) | |
| *C08G 18/67* | (2006.01) | |
| *C08G 101/00* | (2006.01) | |

(52) U.S. Cl.
CPC ............ *C08G 18/73* (2013.01); *C08G 18/3206* (2013.01); *C08G 18/679* (2013.01); *C08G 2101/005* (2013.01); *C08G 2101/0083* (2013.01)
USPC .............. 525/453; 525/452; 528/85; 521/155

(58) Field of Classification Search
USPC ............ 521/170, 155; 528/44, 60, 61, 68, 75, 528/85; 525/453
See application file for complete search history.

(56) References Cited

U.S. PATENT DOCUMENTS

| | | | |
|---|---|---|---|
| 4,312,798 A | 1/1982 | Kovacs | |
| 4,721,769 A | 1/1988 | Rubner | |
| 4,962,213 A | 10/1990 | Frankel | |
| 5,268,489 A * | 12/1993 | Koleske et al. | ............... 549/215 |
| 6,166,127 A | 12/2000 | Tomko | |
| 6,802,533 B1 | 10/2004 | Blomquist | |
| 2004/0016504 A1 | 1/2004 | Mitarai | |

FOREIGN PATENT DOCUMENTS

| | | |
|---|---|---|
| DE | 100 03 157 A1 | 2/2001 |
| EP | 0 033 896 A1 | 8/1981 |
| EP | 0 147 049 A3 | 7/1985 |
| FR | 2 633 300 | 12/1989 |
| FR | 2 810 670 A1 | 12/2001 |
| GB | 768649 | 5/1954 |
| GB | 1010255 | 10/1963 |
| GB | 1199803 | 4/1967 |
| GB | 1366722 | 1/1972 |
| GB | 2 280 903 A | 2/1995 |
| WO | WO 86/07069 | 12/1986 |
| WO | WO 01/44338 A1 | 6/2001 |
| WO | WO 2007/003054 A1 | 1/2007 |

OTHER PUBLICATIONS

Machine translation of DE 100 03 157 from the European Patent Office.*
Catalin Fotea; A comparative study on the use of photereagents for the enhancement of adhesion on heavy-duty leather (Salz leather); International Journal of Adhesion & Adhesives 24 (2004) 479-484.

* cited by examiner

*Primary Examiner* — Melissa Rioja
(74) *Attorney, Agent, or Firm* — Sughrue Mion, PLLC

(57) ABSTRACT

The present invention relates to a method for producing an isocyanate-based polymeric material by polymerizing a reaction mixture which comprises different reaction components, including at least one polyisocyanate component and at least one component which is reactive towards said polyisocyanate component. The reaction components comprise at least one anchor component which has at least one anchor group which enables to bond a functional component covalently to the polymeric material. The anchor group is a reactive unsaturated group which does not react during the polymerization process so that the polymerization process is not interfered. The anchor group is selected to that it can bind the functional component by a click chemistry reaction to the polymeric material. It is more particularly selected so that it can participate in a catalyzed Huisgen 1,3-dipolar cycloaddition reaction or in a Diels-Alder cycloaddition reaction The invention also relates to the obtained isocyanate-based polymeric material, to the use thereof to produce a functionalized polymeric material and to this functionalized polymeric material.

16 Claims, No Drawings

FUNCTIONALISED POLYURETHANES

The present invention relates to a method for producing an isocyanate-based polymeric material, in particular a polyurethane, a polyurea or a polyurea modified polyurethane material, by polymerizing a reaction mixture which comprises different reaction components, including at least one polyisocyanate component which has at least two reactive NCO groups, and at least one isocyanate reactive component which has at least two groups which are reactive towards said polyisocyanate component, said polyisocyanate component and/or said isocyanate reactive component comprising at least one anchor component which has at least one anchor group which enables to bond a functional component covalently to the polymeric material. The invention also relates to the obtained isocyanate-based polymeric material and to the use thereof to produce a functionalised polymeric material.

The production of isocyanate-based polymeric materials, in particular polyurethane materials, by reaction of polyisocyanates with components containing at least two isocyanate reactive hydrogen atoms is well known. Polyurethane materials can be produced as beads, sheets, fibres, coatings, elastomers but in particular, they may be produced as cellular polymers, such as foams, by adding a blowing agent to the polyurethane reactive mixture. The cellular properties of such polyurethane materials may vary from a microcellular product to a highly expanded foam, whereby the cells may be closed or open by proper selection of the amount and type of reactive components, cell control agents, blowing agent and foaming technology. Polyurethane materials have gained a wide interest due their high abrasion resistance, their high flexibility, their high chemical resistance and their excellent mechanical properties, which makes them suitable for a wide range of applications. The targeted applications are numerous among which in the field of automobile, medicine, comfort, buildings, paintings, coatings, adhesives.

In many applications, the polyurethane material is used as a carrier material to which a functional component, which adds an additional functional property to the polyurethane material, is immobilised. Such polyurethane materials are hereinafter referred to as functionalised polyurethanes. Typical examples of functional components are for example dyeing agents, disinfecting agents, ion exchange materials, biologically active materials (for example enzymes), catalysts, cosmetic agents, therapeutic agents, deodorising agents, anti-oxidising agents, scenting agents, complexing agents, cleaners, . . . . Such functionalised polyurethanes offer a lot of additional advantages and hence enlarge the application field of polyurethane materials. The immobilisation of functional components on a polymeric carrier makes it for example possible to use the functional component in a continuous flow process, for example in a water filtration process or in a biotransformation process.

Different methods are known to immobilise functional components onto a polyurethane material. A first method is known as adsorption. In this method, the immobilisation is based upon non-specific physical interactions between the functional component and the surface of a solid polyurethane material. Such immobilisation can for example be obtained by impregnating the polyurethane material with a solution of the functional component. Due to the weak forces however, the functional component can be desorbed over the period of use (i.e. leaching-out), so that the polyurethane material will lose its functionality.

A significantly more stable immobilisation is obtained by directly adding the functional component to the reactive mixture for producing the polyurethane material. The functional component has one or more groups which are reactive towards one or more of the reaction components so that it is built in the polymer structure. Such an immobilisation technique is for example described in U.S. Pat. No. 6,855,739 B2. In the described process, poly(ethyleneimine), which is known for its complexing activity towards heavy metal ions and dyes, is added to the polyurethane foam reaction mixture. Although this method offers the important advantage that no post-treatment is needed, this method still suffers from several drawbacks. First of all, due to the high exothermic conditions of most polyurethane polymerisation processes, the functional component can undergo degradation, thereby decreasing its activity. Heat-sensitive functional components are thus not qualified for this immobilisation technique. Secondly, compatibility problems may arise when adding the functional component to the polyurethane reaction mixture. Furthermore, the functional component can interfere with the polyurethane reaction, for example in the case the functional component has isocyanate reactive groups such as hydroxyl or amine groups, as is the case with poly(ethyleneimine) in U.S. Pat. No. 6,855,739B2. Due to the high reactivity of these groups towards the —NCO groups of the isocyanates, this interference can lead to a less controlled polymerisation process of the polyurethane, as well as to a decreased activity of the functional component. In case the functional component does not have isocyanate reactive groups or other functional groups leading to a chemical bond with the polyurethane reactive mixture, the functional component won't be covalently bound to the polyurethane backbone, leading to leaching out of the functional component as a function of time and hence to a decreasing activity of the functionalised polyurethane foam.

An improvement of the method as described in U.S. Pat. No. 6,855,739B, is disclosed in DE 10003157A1. In a first step of the disclosed method, an anchor component having at least one functional group which is isocyanate reactive, and an anchor group which is a halogen, a carbonyl group, an ester group, an anhydride group, an epoxide group or a sulfon group, is added to the polyurethane reactive mixture and this reactive mixture is allowed to foam. In a next step, the cured foam is treated with a functional component ("active substance"), whereby a covalent bond is formed between this functional component and said anchor group of the anchor component. This process leads to an indirect bond of the functional component to the polyurethane material through the anchor component.

A first drawback of this method however is that each targeted functional component in the material requires a different anchor component which means that many different anchor components need to be synthesized depending on the desired functionality of the polyurethane material. Functional components provided with suitable complementary reactive groups to react with the anchor groups disclosed in DE 10003157 A1 are moreover not readily available, which means that this method puts a restriction on the number of possible functional components being qualified for this immobilisation technique. A further drawback of the method is that the disclosed anchor groups, which are intended to react with the functional component through the described nucleophilic substitution reaction or acylation reaction, can interfere with the polyurethane formation and hence will react with other components present in the polyurethane reactive mixture, thereby decreasing the number of anchor groups available for further reaction with the functional component. A solution to this problem could be the use of protective group chemistry, whereby the anchor groups interfering with the polyurethane polymerisation reaction are in a first step— namely before adding them to the polyurethane reactive mixture—blocked with a protecting group and whereby in a second step—after the polyurethane polymerisation—this blocking group is removed, so that the anchor groups can be reacted with the functional component. This requires however two extra reaction steps. Still another drawback of the method is that for each type of reaction between the anchor group and the functional component a specific catalyst needs to be selected.

An object of the present invention is to provide a new method to produce an isocyanate-based polymeric material which comprises anchor groups which do not interfere with the polymerisation process of the polymer and which are such that a vast range of functional components can be bound covalently to said polymeric material through a simple and highly efficient reaction, whereby neither the availability of the anchor groups nor the activity of the functional component is interfered.

To this end, the method according to the invention is characterised in that said anchor group is selected from the group consisting of a terminal alkyne and an azide, which are able to participate in a Huisgen 1,3-dipolar cycloaddition reaction, or from the group consisting of a diene and a dienophile, which are able to participate in a Diels-Alder cycloaddition reaction.

These anchor groups are reactive unsaturated groups which do not react during the polymerization process but which are suitable for binding said functional component to the polymeric material by a click chemistry reaction, more particularly by the Huisgen 1,3-dipolar cycloaddition reaction or by the Diels-Alder cycloaddition reaction.

These "click reactions" have been defined by Sharpless in *Angew. Chem. Int. Ed.* 2001, 40, 2004 as reactions, wide in scope, giving very high yields, generating only inoffensive byproducts, with process characteristics including simple reaction conditions, readily available starting materials and reagents, the use of no solvent or a solvent that is benign (such as water) or that is easily removed.

In accordance with the present invention it has been found that the anchor groups used in the method according to the invention react quite easily with the complementary reactive unsaturated groups on the functional component to bind this functional component covalently to the polymeric material but do not react with the isocyanate or isocyanate reactive groups of the polyurethane reactive mixture so that they do not interfere with the polymerisation process.

By using the defined anchor component, the method according to the invention enables moreover to produce a "universal" polyurethane material, which can be used for producing a functionalised polyurethane material by "clicking" it to any type of functional component which contains a complementary reactive unsaturated group. Due to the ease by which the claimed unsaturated groups, in particular the azide groups, can be generated on almost any molecule, due to the high kinetic stability thereof and their tolerance to a wide variety of functional groups and reaction conditions, the use of these reactive unsaturated groups in the current invention undoubtedly broadens the range of functional components to be immobilised on the polymeric material. Whereas in the known prior art methods for making functionalised polyurethane materials, different anchor groups are needed to enable covalent binding to different functional components, the method according to the invention provides a polyurethane material with a "universal" anchor group, i.e. readily clickable to almost any functional component, which is properly chosen in order to deliver the desired function to the polyurethane material. Besides the advantage of this "universal clickable" polymeric material, the method according to the invention further makes use of the huge advantages offered by click chemistry reactions for said post-modification process, whereby the functional component is reacted with the polyurethane material in a rapid, highly selective, highly efficient and simple way.

An isocyanate-based polymeric material is generally produced by reacting a polyisocyanate component with at least one isocyanate reactive component. All reactive components used to form polyurethane materials may vary between low molecular weight compounds over oligomers to polymers. The isocyanate reactive component may consist for example of water (as disclosed for example in U.S. Pat. No. 4,137,200 for producing a hydrophilic polyurea-modified polyurethane foam) or of water vapour or steam (for example for curing a prepolymer used for example as coating or adhesive) but is usually a component containing for example hydroxyl, amine and/or thiol groups. The isocyanate-based polymeric material may thus be a polyurea material, a polyurea-modified polyurethane material or a polyurethane material. Since the isocyanate-based material will usually be a polyurethane material, the following description is given with reference to a polyurethane material but this description is also applicable to polyurea or polyurea-modified polymeric materials.

The reactive mixture used in the method according to the invention comprises at least one anchor component, which contains at least one reactive group which reacts during the polymerisation process with one of the reaction components, and at least one anchor group, which is not reactive towards the other polyurethane forming components. This anchor group enables however to covalently bind a functional component, whereby this functional component is covalently anchored to the polymeric material. In one aspect of the invention, the anchor component comprises at least two reactive groups which react during the polymerisation process with one of the reaction components. In this way larger amounts of the anchor component can be used since it does not act as a chain terminator but instead as a chain extender or cross-linker.

The anchor component may comprise at least one, preferably at least two isocyanate groups so that it can react with the isocyanate reactive component or components. In this embodiment, the anchor component may be the main polyisocyanate component. The anchor component is however preferably used in combination with one or more further polyisocyanate components.

In another embodiment, the anchor component comprises at least one, preferably at least two isocyanate reactive hydrogen atoms which are allowed to react with said polyisocyanate component during the curing process, the isocyanate reactive hydrogen atoms being preferably part of a hydroxyl group, an amine group or of a thiol group.

In this embodiment, the anchor component may be the main isocyanate reactive component, in particular a relatively high molecular weight polyol component comprising several anchor groups. Besides the polyisocyanate component and the anchor component, the polyurethane reaction mixture however preferably comprises at least one further component (polyol component), which is reactive towards said polyisocyanate component and which comprises at least two isocyanate reactive hydrogen atoms.

The anchor component according to the invention, can be a terminal alkyne containing alcohol, such as the commercially available propargyl alcohol. In this example there is only one isocyanate reactive hydrogen atom, so that reaction of this hydrogen atom with the polyisocyanate component of the polyurethane reaction mixture will lead to chain termination and to the formation of low molecular weight polyurethane materials. Furthermore, it can be expected that only a limited number of anchor groups can be introduced to minimize the effect on the polyurethane mechanical properties.

To avoid these drawbacks, the anchor component preferably contains at least two reactive groups by which it can by covalently bound to the polyurethane backbone. It can for example contain two isocyanate reactive hydrogen atoms, or two isocyanate functions. In this way the anchor component acts as a chain extender during the polyurethane polymerisation reaction so that more anchor groups can be incorporated in the polymeric material without affecting the mechanical properties thereof. Typical examples are N-propargyldiethanolamine, 2,2-di(prop-2-ynyl)propane-1,3-diol (DPPD), 1-(propargyloxy)benzene-3,5-methanol (PBM), N-propargyldipropanol-amine, 2-propargyl propane-1,3-diol, (2-methyl-2-propargyl)propane-1,3-diol. The anchor component may further also contain more than one anchor group so that in this way also a larger amount of the functional component can be covalently bound to the polymeric material. An example of an anchor component having two anchor groups is 2,2-di(prop-2-ynyl)propane-1,3-diol (DPPD).

The amount of alkyne groups on the polymeric material is dependent upon the used amount of the alkyne containing anchor component and on the alkyne content thereof. The alkyne group content on the polymeric material is preferably higher than 0.1% by weight (based on a molecular weight of the alkyne group of 25).

The obtained polyurethane material is suitable for producing a functionalised polyurethane material, by allowing to react at least one functional component, which comprises a further reactive unsaturated group, to said material by a click chemistry reaction between said anchor group and said further reactive unsaturated group. In a first embodiment, the anchor group and the further reactive unsaturated group are selected so that they can react by a Huisgen 1,3-dipolar cycloaddition reaction. In a second embodiment, the anchor group and the further reactive unsaturated group are selected such that they can react by a Diels-Alder cycloaddition reaction.

Due to the fact that the anchor component contains at least one reactive group, by which it is covalently bound to the polyurethane backbone during the polymerisation process thereof, and that it further contains an anchor group which is not reactive towards the polyurethane reactive mixture, this anchor group is exclusively available to covalently bind a functional component in a post-polymerisation reaction, (i.e. taking place after the polyurethane polymerisation process), so that there is no interference of the polyurethane polymerisation process by the functional component. Neither are there problems related to the compatibility of the functional component with the polyurethane reactive mixture. By selecting a functional component with a specific activity, for example a therapeutic agent, a disinfecting agent, an ion exchange material, the produced polyurethane material has obtained a specific functionality, making it suitable for a broad class of specific applications. Such material is hereinafter referred to as a functionalised polyurethane material. By the fact that the functional component is covalently bound to the polyurethane backbone, the obtained functionalised polyurethane material will maintain its specific functionality, because there won't be any leaching-out problems of the functional component.

Besides these advantages, the main advantage of the new method is that it enables to bind a functional component to a polyurethane material by means of a click chemistry reaction. Preferably, the anchor group and the functional component react with each other by a cycloaddition reaction, more specifically by a 1,3-dipolar cycloaddition, which is known as the Huisgen cycloaddition. This cycloaddition reaction may be performed without a catalyst (i.e. a purely thermal process) but a catalyst is preferably used to increase the reaction rate at lower temperatures. Different catalysts can be used such as Ru, Pd, Pt and Ni. The preferred catalyst is however Cu(I), or a combination of Cu(0) and Cu(II). The catalysed (preferably Cu(I) catalysed) Huisgen cycloaddition of alkynes and azides to form 1,2,3-triazoles is a chemical reaction that occurs rapidly, with high selectivity, with high yield, simple to perform, and therefore reported as an exemplary "click" reaction. In order to enable reaction of the anchor group with the functional component by a Huisgen cycloaddition, the anchor group and the functional component should complementary contain a terminal alkyne and an azide group. Complementary means that if the anchor group contains an alkyne group, the functional component to be reacted therewith should contain an azide group and vice versa.

In another embodiment of the invention, the anchor group contains a reactive unsaturated group suitable for binding the functional component by a Diels-Alder cycloaddition reaction. In this embodiment, the anchor group preferably contains a diene or a dienophile. In order to enable reaction of the anchor group with the functional component by a Diels-Alder cycloaddition reaction, the anchor group and the functional component should complementary contain a diene and a dienophile. Complementary means that if the anchor group contains a diene, the functional component to be reacted therewith should contain a dienophile and vice versa.

In a further preferred embodiment, the produced polyurethane material enables to bind at least two functional components to said material by a click chemistry reaction. These functional components can be bound to the anchor group of the polyurethane material by a Huisgen cyclo-addition reaction, or by a Diels-Alder or by both reactions. For example, if the polyurethane material is produced with an anchor component having an anchor group containing a terminal alkyne group, this material can in a first step be reacted with a first azide containing functional component by the catalysed Huisgen cycloaddition reaction. The unreacted alkyne groups can then in a further step be reacted with a second azide containing functional component by means of the same reaction. Analogously, if the polyurethane material is produced with an anchor component having an anchor group containing a diene group, this material can in a first step be reacted with a first dienophile containing functional component by the Diels-Alder cycloaddition reaction. The unreacted diene groups can then in a further step be reacted with a second dienophile containing functional component by means of the same reaction. In still another embodiment, one anchor component can contain two different anchor groups, in particular an alkyne group and a diene group. On the other hand, it is also possible to use two different anchor components, namely a first anchor component containing an alkyne group and a second anchor component containing a diene group so that the number of alkyne anchor groups in the polymer can be controlled independently of the number of diene anchor groups. The polyurethane material produced with these two anchor components can be first reacted with a first functional component having an azide group by the Huisgen 1,3-cycloaddition, and next be reacted with a second functional component having a dienophile group by a Diels-Alder cycloaddition or vice versa. In still another embodiment, first and second functional components could be simultaneously bound the polyurethane material.

The polyurethane material can be a cellular material, in particular a foam material. It may be prepared in different ways, such as according to the one-shot or the prepolymer or semi-prepolymer foam making technologies, which are all well-known to the skilled man. Besides the polyisocyanate and the isocyanate reactive components, a blowing agent is added, such as a physical blowing agent or a chemical blowing agent like water, or a combination of both. Depending upon the amount of blowing agent, the cellular properties and hence the density of the obtained polyurethane material will vary between a low density cellular material (density lower than 25 kg/m$^3$) and a high density cellular material (density lower than 400 kg/m$^3$). When substantially no blowing agent is used, a microcellular or non-cellular material is obtained with a density higher than or equal to 400 kg/m$^3$. Auxiliary agents are usually added, such as catalysts, cell-openers, surfactants, fillers, colorants . . . . A proper selection of all these components as well as of the polyurethane making technology will enable to tailor the desired properties of the obtained polyurethane material.

Suitable polyisocyanates include, but are not limited to, aromatic polyisocyanates (which are for example industrially readily available such as TDI, MDI), modified polyisocyanates, aliphatic polyisocyanates such as IPDI and HMDI. It is also possible to use prepolymers of the above mentioned isocyanates. Prepolymers are prepared by polymerising one or more polyisocyanates with one or more organic compounds having at least one isocyanate reactive hydrogen atom, such as a polyol. These prepolymers contain free NCO groups which, when the prepolymer is added to the isocyanate reactive components, will participate in the further polymerisation reaction.

Suitable components as isocyanate reactive components, are preferably polyols, for example polyether polyols or polyester polyols or mixtures thereof, in which the polyol preferably contains on average at least two hydroxyl groups per molecule. The isocyanate reactive component may also be a prepolymer prepared by polymerising one or more isocyanate reactive components with one or more isocyanate components having at least one isocyanate group. These prepolymers contain free isocyanate reactive groups which, when the prepolymer is added to the isocyanate component or components, will participate in the further polymerisation reaction.

Catalysts which are known and are conventional in polyurethane chemistry can be used in accordance with the present invention.

In one embodiment of the invention, the obtained polyurethane material is a solid material and more particularly a foam material. Depending of the application of the functionalised polyurethane foam, such as heavy metal absorption of polluted water, it may be desirable that the produced polyurethane foam material is enabled to react through its whole matrix with the functional component, so that the loading thereof is maximal. For this purpose, the polyurethane foam material is preferably open-celled in order to enhance the availability of the anchor groups to react with the functional components. As is known to the skilled man, open-celled polyurethane foams can be obtained by a proper balance of amine/tin catalysts, and by using cell openers. Open-celled polyurethane foams with 100% open can be obtained by a reticulation process, wherein substantially all of the cell windows are destroyed by a thermal, mechanical or chemical method. The availability of the anchor groups to the functional components will further be determined by the specific surface of the foam (m$^2$/g foam). A reduction of the cell size will result in a higher specific surface, and thus in an increased availability of the anchor groups, enabling more functional components to be bound to the polyurethane foam. The characteristics of the foam material such as cell size and density are selected as a function of the final application of the functionalised produced polyurethane foam. In practice, the cell size of polyurethane foams may vary between 400µ and 7000µ (determined according to the Visiocell method as disclosed in WO2007/031517), although cell sizes down to 100µ may be obtained by using specific technologies. Since the reaction of the anchor group with the functional component according to the described click reaction is preferably carried out in an aqueous medium, the polyurethane foam material is preferably a hydrophilic foam. Hydrophilic polyurethane foams will allow the aqueous medium, wherein the functional component is dissolved or dispersed, to penetrate more easily into the foam matrix, so that more functional components can be bound to the polyurethane foam or so that a more uniform distribution of the functional component in the foam matrix can be obtained. Moreover, for certain applications such as wound dressing, water filtration or purification, etc. hydrophilic foams are also more effective.

One of the methods to prepare hydrophilic polyurethane foams is the "prepolymer" process, in which an isocyanate terminated polyoxyethylene glycol prepolymer is mixed and reacted with water. These prepolymers have a defined average isocyanate functionality greater than 2, and may be capped with aromatic isocyanates, such as methylene diphenyl diisocyanate (MDI) or toluene diisocyanate (TDI), or with aliphatic isocyanates such as isophorone diisocyanate (IPDI) or hexamethylene diisocyanate (HMDI). The polyol used for making this prepolymer will have at least 50% oxyethylene (EO) units. The reaction of this prepolymer with an aqueous component, preferably water, to produce a polyurethane foam, takes place in the conventional manner known in the art. Liquid surfactants can be added to the reaction mixture in order to enhance the hydrophilicity of the produced foam.

Such functionalised hydrophilic polyurethane foams will be in particular suitable for active filtration processes, where the functional component is for example a chelating agent, being able to absorb heavy metals or dyes in industrial waste waters. Another application of such functionalised polyurethane foam is wound care, where the functional component is for example an antimicrobially active agent. Examples of hydrophilic polyurethane foams including such an antimicrobially active agent are disclosed in EP-A-1 493 452. In these known examples, the antimicrobially active agent is directly covalently bonded to the hydrophilic polyurethane material during the polymerization thereof. In the method according to the present invention, an anchor component (having at least one but preferably at least two functional groups which may react with the isocyanate groups on the prepolymer) is however first allowed to react during the polymerization reaction with the prepolymer or, alternatively or additionally, use is made of a prepolymer which has already one or more anchor groups. To produce such a prepolymer having one or more anchor groups, the polyoxyethylene glycol can for example be capped with an anchor component having two isocyanate groups. On the other hand, the anchor groups can also be provided by the polyol component (f.e. the polyoxyethylene glycol) for example by using an alkyne containing initiator molecule for producing the polyether polyol or by using a separate anchor component having one or more isocyanate reactive groups.

In another embodiment, the obtained polyurethane material is also a solid material more particularly a high density microcellular or non-cellular material with a density>400 kg/m$^3$. Formulations for producing such materials are for example disclosed in EP0929586B1 and in EP0379246B1. The polyurethane materials produced in accordance with these patents are mainly used in the automotive industry, for example for window encapsulations but especially also for interior trim parts such as dashboards, consoles, glove compartments, door covers etc. For these applications, the requirements being imposed on these polyurethane materials have become more stringent, especially with regard to the surface characteristics, such as tactile feel, dirt sensitivity, abrasion resistance, colour, light stability . . . . According to the method of the invention, an alkyne containing anchor component can be added to the formulation for preparing the polyurethane elastomer. In order to obtain the desired surface characteristics of the elastomer, the produced polyurethane elastomer can be further treated with a Cu(I) containing aqueous solution of an azide derivative of a functional component, such as a fluorochemical compound. Azide derivatives are easily prepared via nucleophilic substitution reactions (V. Coessens, Y. Nakagawa, K. Matyjaszewski, *Polym. Bull.* 1998, 40 135).

The use of fluorochemical compounds to improve surface characteristics such as soil repellency is well known and described for instance in U.S. Pat. No. 4,468,527. According to the invention, an azide derivative of the functional component is used which will react with the alkyne containing anchor component in the polymeric material by a catalysed Huisgen 1,3-dipolar cycloaddition reaction. Due to the non-cellular or microcellular character of the elastomer, only the anchor groups available at the surface thereof will react with the functional component (in this case the fluorochemical compound), so that the functional component will be exclusively bound to the surface of the elastomer. In function of the desired surface characteristics of the elastomer, the proper functional component is specifically chosen in order to react with the "universal" anchor component containing polyurethane elastomer.

When use is made of an alkyne containing anchor component, it has been surprisingly found that the thermal stability of the obtained polymeric materials is improved. Thermogravimetric analysis of alkyne containing polymeric materials showed a residue of up to 20 wt.-% after heating to 800° C., whereas blank polymeric materials (containing no alkyne) showed a residue of only <2%. In order to take advantage of this beneficial effect, the present alkyne functions are preferably not all reacted with the functional component. This can be done in several ways, for instance by using an excess of alkyne functions towards the azide groups of the functional components, or by reducing the accessibility of the alkyne functions towards reaction with the azide groups of the functional components.

In the above described embodiments, the polymeric material is a solid material. To functionalize this material, it is brought in contact with the functional component which is in a fluid form. The functional component may be in a gaseous form but is preferably in a liquid form. The functional component may in particular be a liquid or may be dissolved or dispersed (suspended or emulsified) in a liquid. The solid polymeric material may be impregnated (either superficially or also deeper) with this liquid functional component, in particular by dipping, spraying or by contact impregnation (for example brushing or stamping).

The polymeric material may however also be in a liquid or gel form, it may in particular be a liquid or it may be dissolved or dispersed in a liquid medium, for example in a solvent. In this case, the functional component can be mixed easily with the polymeric material in order to functionalize the polymeric material.

The polymeric material does not have to be cured completely before being functionalized. In a preferred embodiment of the invention, the polymeric material may be a prepolymer which still contains free isocyanate or isocyanate reactive groups which can participate in the further polymerization reaction (in particular an isocyanate or a polyol prepolymer, including the so-called quasi-prepolymers). Such a prepolymer, wherein anchor groups have been provided by incorporating an anchor component therein as described hereabove, can be functionalized by binding at least one functional component thereto before the further polymerization or curing process. An advantage of this embodiment is that since the prepolymer is in a liquid form, it can be functionalized easily substantially uniformly with the functional component. Moreover, higher loadings (with functional groups) can more easily be obtained. The final solid, polymeric material thus may but does not have to be impregnated anymore with any functional component. It is clear that when using such a functionalized prepolymer, further anchor groups can be provided during the further curing process by allowing this prepolymer to react with a further anchor component in the same way as described hereabove.

In order to benefit from the advantages of the present invention, the functionalized prepolymer is a polymer comprising in particular preferably, on average (number average), at least two, preferably at least five urethane or urea linkages. Before being functionalized, the prepolymer has preferably a molecular weight higher than 500 and more preferably higher than 1000 grams per mole. The non-functionalized prepolymer contains preferably at least two, more preferably at least five anchor groups.

EXAMPLES

Synthesis of Linear Polyurethanes

Example 1

In a round-bottom flask were introduced 1 equivalent of hexamethylene diisocyanate, 1 equivalent of a mono alkyne-functionalized aromatic diol, namely 1-(propargyloxy)benzene-3,5-methanol (PBM), or a predetermined mixture of PBM and 1,4-butanediol (BDO) and freshly distilled EtOAc. The mixture was degassed by bubbling nitrogen for 15 min and heated at 50° C. in a preheated oil bath. Then, the tin catalyst, dibutyltin dilaureate, (approximately 20-30 µL) was added and the reaction was allowed to stir under inert atmosphere for 2 h. While its formation, the PU slowly precipitated in the medium and the obtained polymer was then filtered off and widely washed with EtOAc and acetone to remove all unreacted compounds and the catalyst. The synthesized material was dried under vacuum overnight prior to further characterizations such as GPC or NMR.

TABLE 1

Synthesis of linear PUs starting from HDI and the building blocks PBM and/or BDO

| Entry | Reference[a] | Composition (mol %)[b] PBM/BDO/HDI | Mn[c] (g/mol) | PDI[c] |
|---|---|---|---|---|
| 1 | PU-PBM-50 | 50.0/0/50.0 | 9 600 | 1.57 |
| 2 | PU-PBM-25 | 25.0/25.0/50.0 | 14 700 | 2.58 |
| 3 | PU-PBM-8 | 8.0/42.0/50.0 | 6 000[d] | —[d] |
| 4 | PU-PBM-0 | 0/50.0/50.0 | —[e] | —[e] |

[a]Indicated values in the reference names relate to the amount of incorporated PBM in mol %.
[b]Final composition determined by $^1$H NMR in DMSO-$d_6$.
[c]Number average molecular weight (Mn) and polydispersity (PDI) determined by GPC calibrated with PMMA standards. Solvent: DMA + 0.42 g/L LiBr.
[d]The resulting trace is out of the calibration window and only the peak weight (Mp) could be determined.
[e]Not soluble in GPC solvent.

Example 2

In a round-bottom flask were introduced 1 equivalent of hexamethylene diisocyanate, 1 equivalent of a di alkyne-functionalized aliphatic diol, namely 2,2-di(prop-2-ynyl)propane-1,3-diol (DPPD), or a predetermined mixture of DPPD and BDO and freshly distilled EtOAc. The mixture was degassed by bubbling nitrogen for 15 min and heated at 50° C. in a preheated oil bath. Then, the tin catalyst (approximately 20-30 µL) was added and the reaction was allowed to stir under inert atmosphere for 2 h. While its formation, the PU slowly precipitates in the medium and the obtained polymer was then filtered off and widely washed with EtOAc and acetone to remove all unreacted compounds and the catalyst. The synthesized material was dried under vacuum overnight prior to further characterizations such as GPC or NMR.

TABLE 2

Synthesis of linear PUs starting from HDI and the building block DPPD and/or BDO

| Entry | Reference | Composition (mol %)[a] DPPD/BDO/HDI | $Mn$[b] (g/mol) | PDI[b] |
|---|---|---|---|---|
| 1 | PU-DPPD-50 | 50/0/50.0 | 4 800 | 2.66 |
| 2 | PU-DPPD-15 | 15.0/35.0/50.0 | 8 800 | 1.86 |
| 3 | PU-DPPD-0 | 0/50.0/50.0 | —[c] | —[c] |

[a] Final composition determined by $^1$H NMR in DMSO-$d_6$.
[b] Determined by GPC calibrated with PMMA standards. Solvent: DMA + 0.42 g/L LiBr.
[c] Not soluble in GPC solvent.

Click Reaction onto Linear Alkyne-Based Polyurethanes

In examples 3 to 13, the resulting linear polyurethanes were all characterized by 1H NMR (using DMSO-$d_6$ as solvent) and the peak attributed to the alkyne proton has completely disappeared and a new peak coming from the proton of the triazole ring appeared in the range of 7.5-8.5 ppm, proving the success of the mentioned reactions.

Example 3

In a round-bottom flask, the alkyne-functionalized linear PU (1 equivalent of alkyne functions) was charged with benzyl azide (2 equivalents), DMSO and the copper catalyst based on CuBr and PMDETA (0.1 equivalent each according the alkyne content). The reaction was allowed to stir under nitrogen atmosphere at 50° C. overnight. The resulting modified material was precipitated in diethyl ether and dried under vacuum overnight prior to further characterizations. NMR analysis revealed the quantitative formation of the 1,2,3-triazole ring, indicating that the click reaction was successful.

Example 4

Same as example 3, except N-2-(azidoethyl)phthalimide was used instead of benzyl azide.

Example 5

Same as example 3, except 1,1,1,2,2,3,3,4,4,5,5,6,6-tridecafluoro-8-azidooctane was used instead of using benzyl azide.

Example 6

Same as example 3, except 1,1,1,2,2,3,3,4,4,5,5,6,6,7,7,8,8-heptadecafluoro-10-azidododecane was used instead of benzyl azide.

Example 7

Same as example 3, except azido end-functionalized Zonyl-FSO-100® was used instead of benzyl azide.

Example 8

Same as examples 3 to 7, except copper (II) sulfate pentahydrate and L(+)-Ascorbic acid sodium salt (also called sodium ascorbate) were used as copper catalyst instead of the use of CuBr/PMDETA.

Example 9

In a round-bottom flask, the phthalimide-functionalized PU-PBM-100 (Example 4, 1 eq.) was dissolved in DMF. A solution of hydrazine monohydrate in DMF was slowly added to the reaction mixture. Then, the temperature was fixed at 70° C. for 4 h. The reaction mixture was cooled down to room temperature and the PU was precipitated into diethyl ether. The amino-functionalized polymer was filtered off and dried under vacuum prior to characterizations such as NMR, GPC, DSC and FT-IR.

Example 10

Same as example 9, except PU-PBM-50 was used instead of PU-PBM-100.

Example 11

Same as example 9, except PU-PBM-16 was used instead of PU-PBM-100.

Example 12

Same as example 9, except PU-DPPD-100 was used instead of PU-PBM-100.

Example 13

Same as example 9, except PU-DPPD-31 was used instead of PU-PBM-100.

Synthesis of Polyurethane Foams

Example 14

Table 3, Ref 3 and 4

All the synthesized PU foams were made in a size of 10×10×10 cm and the formulation was calculated on the basis of a density around 45.4 kg/m$^3$.

In a recipe, the two different polyols (Lupranol VP9349 and Lupranol 2084) were mixed with the solid monoalkyne diol (PBM). The complete dissolution was ensured by heating the mixture in an oven at 80° C. until a homogeneous liquid mixture is obtained. After, the other components were added such as the surfactant Niax L620, water and Dabco 33LV. After premixing, the tin catalyst SO (stannous octoate) is added to the mixture, shortly mixed and finally, the TDI is immediately introduced for the foaming reaction. After the foaming phenomenon is finished, the PU foam was cured in the oven for 15 minutes. In Table 3 the different formulations used in the foam processing are reported.

Example 15

Table 3, Ref 2, 5, 6, 7

All the synthesized PU foams were made in a size of 10×10×10 cm and the formulation was calculated on the basis of a density around 45.4 kg/m$^3$.

In a recipe, the two different polyols (Lupranol VP9349 and Lupranol 2084) were mixed with the solid dialkyne diol (DPPD). The complete dissolution was ensured by heating the mixture in an oven at 80° C. until a homogeneous liquid mixture is obtained. After, the other components were added such as the surfactant Niax L620, water and Dabco 33LV. After premixing, the tin catalyst SO is added to the mixture, shortly mixed and finally, the TDI is immediately introduced for the foaming reaction. After the foaming phenomenon is finished, the PU foam was cured in the oven for 15 minutes. In Table 3 are reported the different formulations used in the foam processing.

TABLE 3

Compositions of each formulation of PU foams

| Ref. | Lupranol VP9349 (g) | Lupranol 2084 (g) | Niax L620 (g) | Diol used/ quantity (g) | Loading$^{a)}$ (mmol/g) |
|---|---|---|---|---|---|
| 1 | 28.0 | 12.0 | 0.48 | Blank/0 | 0 |
| 2 | 28.0 | 12.0 | 0.48 | DPPD/2.0 | 0.45 |
| 3 | 28.0 | 12.0 | 0.48 | PBM/2.0 | 0.176 |
| 4 | 28.0 | 12.0 | 0.48 | PBM/4.0 | 0.326 |
| 5 | 28.0 | 12.0 | 0.96 | DPPD/2.0 | 0.444 |
| 6 | 20.0 | 20.0 | 0.48 | DPPD/2.0 | 0.447 |
| 7 | 20.0 | 20.0 | 0.48 | DPPD/4.0 | 0.811 |

0.16 g of Dabco 33LV and 0.05 g of SO were added in each formulation.
$^{a)}$Alkyne theoretical loadings in the materials.

With each of the formulations indicated in Table 3 the same foam properties could be achieved and the effect of the alkyne diols was hardly noticeable on the processability, reactivity and physical properties. Also the air permeability and the foam structure could be maintained by an appropriate control of the foam process.

Click Reaction onto Alkyne-Based Polyurethane Foams

In examples 16 to 22, the disappearance of the azide compounds in the reaction mixture was followed by Gas Chromatography (GC).

Example 16

In a round-bottom flask, the alkyne-functionalized polyurethane foam (Reference 7, Table 3, 1 equivalent of alkyne functions) was charged with benzyl azide (2 equivalents), acetone and the copper catalyst based on CuBr and PMDETA (0.1 equivalent each according the alkyne content). The reaction was allowed to stir under nitrogen atmosphere at room temperature for 24 hours. The resulting modified material was washed with water and acetone and dried under vacuum overnight prior to further characterizations. Conversion of the reaction was followed by Gas Chromatography (GC)

Example 17

Same as example 16, except a mixture of acetone and water (1/1 volume ratio) was used instead of pure acetone and also copper (II) sulfate pentahydrate and L(+)-ascorbic acid sodium salt (also called sodium ascorbate) were used as copper catalyst instead of CuBr/PMDETA.

Example 18

Same as examples 16 and 17, except N-2-(azidoethyl)phthalimide was used instead of benzyl azide.

Example 19

Same as examples 16 and 17, except 1,1,1,2,2,3,3,4,4,5,5,6,6-tridecafluoro-8-azidooctane was used instead of benzyl azide.

Example 20

Same as examples 16 and 17, except azido end-functionalized Zonyl-FSO-100® having the formula $F_3C(CF_2)_x(CH_2CH_2)_yCH_2CH_2N_3$ was used instead of benzyl azide.

Example 21

Same as examples 16 and 17, except the fluorescent compound named tetramethylrhodamine-5-carbonyl azide was used instead of benzyl azide. Using a confocal microscopy, emitted fluorescence could be recorded showing the success of the reactions with the resulting foams.

Example 22

Same as examples 16 and 17, except the fluorogenic compound named 4-azido-N-ethyl-1,8-naphthalimide was used instead of benzyl azide. Using a confocal microscopy, emitted fluorescence could be recorded showing the success of the reactions with the resulting foams.

Synthesis of Polyurethane Films

Example 23

Table 4, Ref 1

All the synthesized PU films were made using a two-step process.
First, in a recipe a NCO-prepolymer was synthesized by mixing toluene diisocyanate (TDI) and the solid dialkyne diol 2,2-di(prop-2-ynyl)propane-1,3-diol (DPPD). The temperature was fixed at 100° C. In a second step, DPPD and poly (ethylene glycol) (molecular weight of 600, PEG600) were mixed at 80° C. and cooled down followed by the addition of the previously synthesized NCO-prepolymer and Bismuth neodecanoate (metal catalyst) to start the reaction. The reaction mixture is fastly poured in another glass recipe and the PU film was further cured at 80° C. to complete the reaction.

Example 24

Table 4, Ref 2

Same as example 23, except poly(propylene glycol) (molecular weight of 2000, PPG2000), trimethylolpropane (TMP) and butanediol (BDO) were used instead of PEG600.

Example 25

Table 4, Ref 3

Same as example 23, except PPG2000 and butanediol were used instead of PEG600.

Example 26

Table 4, Ref 4, 5

Same as example 23, except Desmophen 41WB01 was used instead of PEG600.

Example 27

Table 4, Ref 6

All the synthesized PU films were made using a two-step process.

Firstly, in a recipe, a NCO-prepolymer was synthesized by mixing TDI and the solid dialkyne diol (PBM). The temperature was fixed at 100° C. In a second step, PBM, PPG2000, TMP and BDO were mixed at 80° C. and cooled down followed by the addition of the previously synthesized NCO-prepolymer and Bismuth neodecanoate (metal catalyst) to start the reaction. The reaction mixture is fastly poured in another glass recipe and the PU film was further cured at 80° C. to complete the reaction.

Example 28

Table 4, Example 7

Same as example 27, except TMP was not used in this formulation.

TABLE 4

Compositions of each formulation of PU films

| Ex. | DPPD (g) | PBM (g) | PEG 600 (g) | PPG 2000 (g) | Desmophen 41WB01 (g) | TMP (g) | BDO (g) | TDI (g) |
|---|---|---|---|---|---|---|---|---|
| 1 | 31.0 | — | 25.9 | — | — | — | — | 43.1 |
| 2 | 15.9 | — | — | 47.7 | — | 1.6 | 3.1 | 31.8 |
| 3 | 18.2 | — | — | 36.5 | — | — | 7.1 | 38.1 |
| 4 | 17.6 | — | — | — | 57.1 | — | — | 25.3 |
| 5 | 24.9 | — | — | — | 43.3 | — | — | 31.7 |
| 6 | — | 22.8 | — | 40.7 | — | 1.6 | 2.4 | 32.5 |
| 7 | — | 30.1 | — | 21.5 | — | — | 6.5 | 41.9 |

PEG 600: polyethylene glycol (OH functionality of 2, molecular weight of 600 g/mol),
PPG 2000: polypropylene glycol (OH functionality of 2, molecular weight of 2000 g/mol),
TMP: trimethylolpropane,
BDO: butane-1,4-diol,
TDI: Toluene diisocyanate.

Click Reaction onto Alkyne-Based Polyurethane Films

Example 29

In a round-bottom flask, the alkyne-functionalized polyurethane film (Examples 2, 4, 5, 6, Table 4, 1 equivalent of alkyne functions) was charged with 4-azido-N-ethyl-1,8-naphthalimide (1 equivalent), solvents (acetone/water in 3/1 ratio) and the copper catalyst based on copper sulfate pentahydrate and L(+)-ascorbic acid sodium salt (also called sodium ascorbate). The reaction was allowed to stir under air atmosphere at room temperature for 24 hours. The resulting modified material was washed with water and acetone and dried under vacuum overnight prior to further characterizations such as contact angle measurements or confocal microscopy.

Example 30

Same as example 29, except azido end-functionalized Zonyl-FSO-100® was used instead of 4-azido-N-ethyl-1,8-naphthalimide.

Example 31

Same as example 29, except 1,1,1,2,2,3,3,4,4,5,5,6,6-tridecafluoro-8-azidooctane was used instead of 4-azido-N-ethyl-1,8-naphthalimide.

Example 32

Same as example 31, except different equivalents of 1,1,1,2,2,3,3,4,4,5,5,6,6-tridecafluoro-8-azidooctane were used from 0.1 to 0.9 instead of 1.

Example 33

Same as example 29, except 3-azidopropanol was used instead of 4-azido-N-ethyl-1,8-naphthalimide.

Example 34

Same as example 29, except azido end-functionalized polyethylene glycol was used instead of 4-azido-N-ethyl-1,8-naphthalimide and only water was used as solvent. Using a confocal microscopy, emitted fluorescence could be recorded showing the success of the reactions with the resulting films.

The invention claimed is:

1. A method for producing a functionalised isocyanate-based polymeric material, wherein an isocyanate-based polymeric material is produced by polymerizing a reaction mixture which comprises different reaction components, including at least one polyisocyanate component which has at least two reactive NCO groups, and at least one isocyanate reactive component which has at least two groups which are reactive towards said at least one polyisocyanate component, said at least one polyisocyanate component and/or said at least one isocyanate reactive component comprising at least one anchor component which has at least one anchor group which enables to bind a functional component covalently to said isocyanate-based polymeric material and which has at least two reactive NCO groups or at least two isocyanate reactive hydrogen atoms, and wherein said isocyanate-based polymeric material is functionalized by allowing at least one functional component, which comprises a reactive group, to bind covalently to said isocyanate-based polymeric material wherein, said at least one anchor group is a terminal alkyne, which is able to participate in a Huisgen 1,3-dipolar cycloaddition reaction with an azide, and wherein the reactive group of said at least one functional component is an azide and the at least one functional component is allowed to bind covalently to said isocyanate-based polymeric material by a Huisgen 1,3-dipolar cycloaddition reaction between the terminal alkyne anchor group and the azide group of said at least one functional component.

2. A method according to claim 1, characterised in that said at least one anchor component comprises at least two isocyanate reactive hydrogen atoms which are allowed to react with said at least one polyisocyanate component during the polymerisation process.

3. A method according to claim 2, characterised in that said reaction mixture comprises, in addition to said at least one anchor component, at least one further component which is reactive towards said at least one polyisocyanate component and which comprises at least two isocyanate reactive hydrogen atoms.

4. A method according to claim 1, characterised in that said at least one anchor component comprises at least two isocyanate groups which are allowed to react with said at least one isocyanate reactive component during the polymerisation process.

5. A method according to claim 4, characterised in that said at least one anchor component has at least two anchor groups which enable each to bind a functional component covalently to said isocyanate-based polymeric material and which include a first anchor group, which is said alkyne group which can participate in a Huisgen 1,3-dipolar cycloaddition reaction, and a second anchor group, which is a diene or a dienophile and which can participate in a Diels-Alder cycloaddition reaction.

6. A method according to claim 1, characterised in that said isocyanate-based polymeric material is a prepolymer containing free isocyanate or isocyanate reactive groups enabling to further cure said isocyanate-based polymeric material.

7. A method according to claim 1, characterised in that said isocyanate-based polymeric material is a substantially completely cured material.

8. A method according to claim 1, characterised in that said isocyanate-based polymeric material is in the form of a liquid or a gel.

9. A method according to claim 1, characterised in that said isocyanate-based polymeric material is in a solid form.

10. A method according to claim 9, characterised in that said isocyanate-based polymeric material is a foam having a density lower than 400 kg/m$^3$.

11. A method according to claim 10, characterised in that said foam has an open cell content of >90%.

12. A method according to claim 10, characterised in that said foam is a hydrophilic foam.

13. A method according to claim 9, characterised in that said isocyanate-based polymeric material has a density higher than 400 kg/m$^3$.

14. A method according to claim 9, characterised in that said solid isocyanate-based polymeric material is functionalized by bringing it into contact with said at least one functional component which is in a liquid form.

15. A functionalised isocyanate-based polymeric material obtained by the method according to claim 1.

16. A functionalised isocyanate-based polymeric material according to claim 15, characterised in that it comprises functional component residues which are covalently bound to the said isocyanate-based polymeric material through a 1,2,3-triazole group.

* * * * *